US011390008B2

(12) United States Patent
Clay et al.

(10) Patent No.: US 11,390,008 B2
(45) Date of Patent: Jul. 19, 2022

(54) PRODUCTION OF SEMICRYSTALLINE PARTS FROM PSEUDO-AMORPHOUS POLYMERS

(71) Applicants: Bruce Clay, Boyertown, PA (US); Timothy A. Spahr, Galesville, WI (US); Philippe Bussi, Maisons Laffitte (FR); Richard Audry, Lons (FR); Jason M. Lyons, King of Prussia, PA (US); Yves Deyrail, Aviron (FR)

(72) Inventors: Bruce Clay, Boyertown, PA (US); Timothy A. Spahr, Galesville, WI (US); Philippe Bussi, Maisons Laffitte (FR); Richard Audry, Lons (FR); Jason M. Lyons, King of Prussia, PA (US); Yves Deyrail, Aviron (FR)

(73) Assignee: Arkema Inc., King of Prussia, PA (US)

( * ) Notice: Subject to any disclaimer, the term of this patent is extended or adjusted under 35 U.S.C. 154(b) by 2 days.

(21) Appl. No.: 16/710,163

(22) Filed: Dec. 11, 2019

(65) Prior Publication Data
US 2020/0147852 A1 May 14, 2020

Related U.S. Application Data

(63) Continuation-in-part of application No. PCT/US2018/037538, filed on Jun. 14, 2018.
(Continued)

(51) Int. Cl.
*B29C 48/78* (2019.01)
*B29C 48/00* (2019.01)
(Continued)

(52) U.S. Cl.
CPC ............ *B29C 48/78* (2019.02); *B29C 48/022* (2019.02); *B29C 48/07* (2019.02); *B29K 2071/00* (2013.01); *B29K 2995/004* (2013.01)

(58) Field of Classification Search
CPC ....... B29C 48/78; B29C 48/022; B29C 48/07; B29K 2071/00; B29K 2995/004
See application file for complete search history.

(56) References Cited

U.S. PATENT DOCUMENTS 4,937,135 A * 6/1990 Bloom .................... B32B 27/08
428/215
5,221,728 A 6/1993 Bennett et al.
(Continued)

FOREIGN PATENT DOCUMENTS

| EP | 2353670 A2 | 8/2011 |
|---|---|---|
| JP | 2016124904 | 7/2016 |

(Continued)

OTHER PUBLICATIONS

APTIV-film-VICTREX PEEK Film (pp. 1-4) produced bywww.aptivfilms.com (Year: 2012).*
(Continued)

*Primary Examiner* — Matthew J Daniels
*Assistant Examiner* — Shibin Liang
(74) *Attorney, Agent, or Firm* — Lynn B. Morreale (57) ABSTRACT

A method of manufacturing a semi-crystalline article from at least one pseudo-amorphous polymer including a poly aryl ether ketone, such as PEKK, including a softening step, wherein the at least one pseudo-amorphous polymer is heated to a temperature above its glass transition temperature to soften the polymer, and a crystallization step, wherein the at least one pseudo-amorphous polymer is heated to a temperature between its glass transition temperature and melting temperature, the pseudo-amorphous polymer being placed on a mold during either the softening step or the crystallization step before at least some crystallization takes place. The method results in articles demonstrating increased opacity, increased crystallinity, increased thermal resistance, improved chemical resistance, and improved (Continued)

mechanical properties over articles formed by traditional thermoforming processes.

18 Claims, 3 Drawing Sheets

Related U.S. Application Data (60) Provisional application No. 62/519,906, filed on Jun. 15, 2017.

(51) Int. Cl.
  *B29C 48/07* (2019.01)
  *B29K 71/00* (2006.01)

(56) References Cited

U.S. PATENT DOCUMENTS

| | | |
|---|---|---|
| 2003/0219646 A1 | 11/2003 | Lecostaoueo |
| 2009/0104420 A1 | 4/2009 | Nadella et al. |
| 2009/0137767 A1 | 5/2009 | Grant et al. |
| 2010/0052201 A1 | 3/2010 | Nadella |
| 2010/0147446 A1 | 6/2010 | Ciolozyk et al. |
| 2013/0298647 A1 | 11/2013 | Falk-Jordan |
| 2013/0323416 A1* | 12/2013 | Bertelo ............... B29B 15/00 427/180 |
| 2014/0128566 A1 | 5/2014 | Grant et al. |
| 2014/0230634 A1 | 8/2014 | Nakai |
| 2014/0316063 A1 | 10/2014 | Hochstetter et al. |
| 2015/0353709 A1 | 12/2015 | Upasani et al. |
| 2016/0121561 A1 | 5/2016 | Godon et al. |
| 2016/0145747 A1 | 5/2016 | Watson et al. |

FOREIGN PATENT DOCUMENTS

| | | |
|---|---|---|
| JP | 2016124904 A2 | 7/2016 |
| WO | WO9006957 | 6/1990 |
| WO | WO 2007/058530 A1 | 5/2007 |
| WO | WO2010091136 A1 | 8/2010 |
| WO | WO 2011/076244 A1 | 6/2011 |
| WO | WO 2015/132766 A1 | 9/2015 |
| WO | WO 2016/012708 A1 | 1/2016 |
| WO | WO 2017/001805 A1 | 1/2017 |
| WO | WO 2017/013369 A1 | 1/2017 |
| WO | WO 2018/232119 A1 | 12/2018 |

OTHER PUBLICATIONS

Thermoforming_APTIV film-VICTREX PEEK Film (how to use the film) (pp. 1-3) produced bywww.aptivfilms.com (Year: 2012).*
Victrex PEEK Film Technology Flyer, published Apr. 2012.
Victrex Thermoforming APTIV Film, published Apr. 2012

* cited by examiner

FIG. 2

PRODUCTION OF SEMICRYSTALLINE PARTS FROM PSEUDO-AMORPHOUS POLYMERS

CROSS REFERENCE TO RELATED APPLICATION

This application is a continuation in part of International Application No. PCT/2018/037538, filed Jun. 14, 2018, which claims priority to U.S. Provisional Application No. 62/519,906, filed Jun. 15, 2017, the entire disclosures of which are incorporated herein by reference for all purposes.

FIELD OF THE INVENTION

The present invention provides articles comprising a poly(aryl ketone), such as polyetherketoneketone (PEKK), and associated methods of making the same by thermoforming processes.

BACKGROUND OF THE INVENTION

High temperature thermoplastic polymers, such as polyaryletherketones (PAEKs), are continuously being evaluated as options in a multitude of applications, including those in the aerospace and integrated circuit industries. In general, PEKKs feature exceptional characteristics, including high-temperature and chemical resistance, very good mechanical properties, excellent abrasion resistance, and natural flame retardancy. PEKK parts may be produced by a multitude of processes, including thermoforming processes. PEKK parts formed by traditional thermoforming processes, however, may not demonstrate a desired resistance to deformation, among other properties.

The process of thermoforming is a routine manufacturing method. In traditional thermoforming, a plastic sheen is heated to a high temperature and placed in contact with a cold (or room-temperature) mold to form a desired shape. When an amorphous or pseudo-amorphous sheet is thermoformed by such traditional thermoforming methods, the thermoformed part is rapidly cooled and thus, is also amorphous and retains the properties of the amorphous sheet subjected to thermoforming. In certain applications, however, it would be desirable to form a semi-crystalline part having the shape of the desired mold. There remains a need for thermoforming processes that can produce a semi-crystalline part from an amorphous or pseudo-amorphous sheet thus producing a molded part which exhibits increased thermal resistance, improved chemical resistance, and improve mechanical properties in comparison to an amorphous or pseudo-amorphous part formed by conventional thermoforming processes.

SUMMARY OF THE INVENTION

Embodiments of the present invention provide articles comprising a poly(aryl ketone), such as polyetherketoneketone (PEKK), and associated methods of making the same by novel thermoforming processes.

In some instances it is desirable to produce a thermoformed part that is semi-crystalline from a pseudo-amorphous polymer sheet. Similarly, in some instances it is desirable to significantly increase the crystallinity of a previously molded part having a low crystallinity without distorting that part. According to an embodiment of the present invention, a method of producing a molded part comprises thermoforming at least one polymer comprising a pseudo-amorphous PAEK, such as pseudo-amorphous PEKK, under conditions effective to produce a semi-crystalline molded article.

According to an embodiment, a method of manufacturing a semi-crystalline article from at least one pseudo-amorphous polymer comprises a softening step in which at least one pseudo-amorphous polymer is heated to a temperature above the glass transition temperature of the pseudo-amorphous polymer without substantive crystallizing the pseudo-amorphous polymer to soften the pseudo-amorphous polymer and a crystallization step wherein the at least one pseudo-amorphous polymer is heated to a temperature above the glass transition temperature of the pseudo-amorphous polymer and below the melting temperature of the pseudo-amorphous polymer for a time sufficient to allow the pseudo-amorphous polymer to crystallize. During the softening step, it is conceivable that some crystallization may take place; however, preferably if crystallization occurs at the softening step, such crystallization is less than 10%, less than 5%, less than 2%, less than 0.5%, less than 0.1%, or less than 0.001%. In some embodiments the pseudo-amorphous polymer may be placed on a mold during the softening step. In some embodiments the pseudo-amorphous polymer may be placed on a mold during the crystallization step before at least some of the crystallization takes place. A semi-crystalline molded article may be formed on the mold. The semi-crystalline molded article may be opaque; however, in certain embodiments the semi-crystalline article may be almost translucent or translucent.

In some embodiments, the pseudo-amorphous polymer may be a poly(aryl ketone) which may be selected from the group of polyetherketoneketone (PEKK), polyetheretherketone (PEEK), polyetherketone (PEK), polyetherketoneetherketoneketone (PEKEKK), and mixtures thereof, preferably PEKK. According to some embodiments, the pseudo-amorphous polymer may be PEKK and may have a T:I isomer ratio within a range of 50/50 to 85/15, preferably within a range of 65/33 to 75/25, such as a T:I isomer ratio of 70/30 (+/−2). According to other embodiments, the pseudo-amorphous polymer preferably is PEKK having a T:I ratio of about 72:28, or about 71:29, or about 70:30, or about 69:31, or about 68:32.

In some embodiments, the pseudo-amorphous polymer may be in the form of a sheet. In such embodiments, the sheet may be maintained on the mold during the crystallization step for a time period in the range of one second to one minute or less, preferably forty seconds or less, optionally thirty seconds or less, twenty seconds or less, or ten seconds or less. In some embodiments, the pseudo-amorphous polymer, in sheet form, may be transparent or semi-transparent.

In some embodiments, the mold may be heated on at least one side. In some embodiments, the pseudo-amorphous polymer may be heated to a temperature within the range of 380° F. to 450° F., 380° F. to 440° F., 400° F. to 440° F., or 420° F. to 440° F., during the softening step. During the softening step, in some embodiments, the temperature may be measured using a non-contact method, such as by using a non-contact infrared gun. In some embodiments, the mold and pseudo-amorphous polymer may be heated to a temperature in the range of 380° F. to 580° F., 400° F. to 500° F., 425° F. to 460° F., or 440° F. to 450° F. during the crystallization step. In some embodiments, the temperature of the pseudo-amorphous polymer may be measured by using a probe within the mold.

In some embodiments, the pseudo-amorphous polymer is placed on the during or immediately prior to the crystallization step. In some embodiments, the pseudo-amorphous polymer may be placed onto the mold using a vacuum subsequent to the softening step, in other embodiments, the pseudo-amorphous polymer is maintained on the mold during both the softening step and the crystallization step.

In some embodiments, the molded article produced may demonstrate at least 1% improved crystallinity over the pseudo-amorphous polymer, at least 5% improved crystallinity over the pseudo-amorphous polymer, and optionally improved crystallinity over the pseudo-amorphous polymer within the range of 30-40%.

Other embodiments of the present invention are directed to semi-crystalline molded articles prepared from sheets of at least one pseudo-amorphous polymer by a process of heating a sheet of at least one pseudo-amorphous polymer to a temperature above the glass transition temperature of the pseudo-amorphous polymer without substantive crystallizing the pseudo-amorphous polymer to soften the pseudo-amorphous polymer and heating the sheet to a temperature above the glass transition temperature of the pseudo-amorphous polymer and below the melting temperature of the pseudo-amorphous polymer for a time sufficient to allow the pseudo-amorphous polymer to crystallize, wherein the sheet is placed on a mold before at least some of the crystallization takes place and is transformed into a semi-crystalline molded article based upon the mold. Still other embodiments of the present invention are directed to semi-crystalline molded articles prepared from transparent or semi-transparent pseudo-amorphous polymer by a process of placing the pseudo-amorphous article onto a mold, heating the mold to a temperature above the glass transition temperature of the pseudo-amorphous polymer and below the melting temperature of the pseudo-amorphous polymer for a time sufficient to allow the pseudo-amorphous polymer to crystallize and transforming the pseudo-amorphous article into the semi-crystalline molded article.

In embodiments directed to semi-crystalline molded articles, the at least one pseudo-amorphous polymer may comprise a poly(aryl ketone), such as a PAEK selected from the group consisting of polyetherketoneketone (PEKK), polyetheretherketone (PEEK), polyetherketone (PEEL), polyetherketoneetherketoneketone (PEKEKK), and mixtures thereof. In some embodiments, the semi-crystalline molded article may comprise PEKK.

DETAILED DESCRIPTION OF THE INVENTION

Traditional thermoforming processes involve heating (e.g., in an oven) a sheet of material, such as a plastic sheet, to a high temperature, such as a temperature above the glass transition temperature of the material and placing the heated sheet in contact with a cold (e.g., room temperature) mold to form a desired shape. The sheet may be stretched into or onto a mold using, for instance, a vacuum. When sheets of pseudo-amorphous or amorphous materials are subjected to such traditional thermoforming processes, the thermoformed part is rapidly cooled on the mold, thus taking the form of the mold. The rapidly cooled thermoformed part retains the properties of the pseudo-amorphous or amorphous sheet subjected to thermoforming.

Thermoforming is useful, inter alia, to obtain molded articles comprised high performance engineering plastics. These include polyaryletherketones, such as PEKK, PEEK, PEK, and PEKEKK, in addition to other polymers such as polyamides, including high temperature polyamides. In many applications, it is desirable to improve the resistance to deformation of a molded part, such as those comprising PEKK, for instance, by increasing the crystallinity of the molded part.

The applicants have developed novel methods for thermoforming articles comprised of polyaryletherketones, such as poly(etherketoneketone) (PEKK), which produce parts with increased crystallinity, increased thermal resistance, improved chemical resistance, and improved mechanical properties over conventional thermoforming processes. Methods of the present invention include using particular temperature profiles, heated molds, and additional processing conditions that enable the crystallization of pseudo-amorphous polymers during the thermo-forming process.

As used herein, the term "article" may be used interchangeably with "part" or "object." Exemplary articles of the present invention may comprise (or may comprise parts of), for example, speaker cones, speaker spiders, back-end/burn in integrated circuit (IC) test sockets, IC wafer carriers, IC wafer handling tools, IC handling trays, Electronic packaging, blister packaging, 3D electronic circuits, bearings, backing plates, bushings, sensors, switches, electronic housings, tubing, cylinders, cups, containers, container lids, satellite panels, mirrors, pump parts (e.g., impellers, stators, housings), aerospace parts (e.g., cabinets, cabinet doors, sinks, control panels, toilets, passenger seat parts, including backs and pans), compressed Natural Gas (CNG) or Compressed Liquefied Petroleum Gas (CLPG) composite tank forms, composite tooling forms, laminate protective cover films (e.g. for FIT/EDM/REF tooling), and chemical storage containers. Exemplary articles of the present invention may comprise specialized parts of intricate geometry with potential applications including, but not limited to, aerospace, aircraft, oil and gas, electronics, building and construction, ducting, and high temperature containers, among others.

"Thermoforming" (encompassing "vacuum forming"), as used herein and in the art, comprises heating a sheet of material to a pliable temperature (e.g., in an oven) and forming the heated sheet onto a cold mold (e.g., a room temperature mold). The heated sheet May be stretched onto or over the mold using a vacuum and may cool thereon resulting in a molded article.

As used herein, the "sheet" or "film" that is thermoformed refers to layers or membranes, which are known to those of ordinary skill in the art. The term "sheet" or "film" may be used interchangeably with the term "membrane" herein. The sheets or films may be adhered to a substrate or completely independent therefrom. The sheets or films may be-nonporous, porous, microporous, etc., depending on the application and use. The thicknesses of the sheets and films are unlimited and may be any suitable thickness. For example, the films may have a thickness from about 6 microns to about 7000 microns, preferably: about 300 microns or more, about 500 microns or more, and thicknesses greater than 500 microns up to about 7000 microns. The thickness may be measured, for example, using a standard micrometer.

As used herein, "pseudo-amorphous" polymers comprise polymers having from 0 percent crystallinity to less than about seven percent crystallinity as determined by X-ray diffraction. For example, pseudo-amorphous polymers as discussed herein may be below seven percent crystallinity, preferably below five percent crystallinity, more preferably below three percent crystallinity. As used herein, "semi-crystalline" polymers comprise polymers having at least three percent crystallinity as determined by X-ray diffraction. Semi-crystalline polymers as discussed herein may comprise at least five percent crystallinity or at least seven percent crystallinity, with a preference of at least five percent crystallinity.

As used herein, each compound may be discussed interchangeably with respect to its chemical formula, chemical name, abbreviation, etc. For example, PEKK may be used interchangeably with polyetherketoneketone. Additionally, each compound described herein, unless designated otherwise, includes homopolymers and copolymers. The term "copolymers" is meant to include polymers containing two or more different monomers and can include, for example, polymers containing two, three or four different repeating monomer units.

As used herein and in the claims, the terms "comprising" and "including" are inclusive or open-ended and do not exclude additional unrecited elements, compositional components, or method steps. Accordingly, the terms "comprising" and "including" encompass the more restrictive terms "consisting essentially of" and "consisting of."

According to an aspect of the present invention, a method of manufacturing a semi-crystalline article comprises a softening step of heating at least one pseudo-amorphous polymer to a temperature above the glass transition temperature of the pseudo-amorphous polymer without substantively crystallizing the pseudo-amorphous polymer to soften the pseudo-amorphous polymer and a crystallization step of heating the at least one pseudo-amorphous polymer to a temperature above the glass transition temperature of the pseudo-amorphous polymer and below the melting temperature of the pseudo-amorphous polymer for a time sufficient to allow the pseudo-amorphous polymer to crystallize. The pseudo-amorphous polymer may be placed on a mold during either the softening step or the crystallization step before at least some of the crystallization takes place and a semi-crystalline molded article may be formed using the mold.

In embodiments, the "at least one polymer" that is subjected to the methods disclosed herein may comprise, consist essentially of, or consist of at least at least one poly(aryl ketone), preferably PEKK. Poly(aryl ketones) are intended to encompass all homopolymers and copolymers (including, e.g., terpolymers) and the like. In one embodiment, the poly(aryl ketone) is selected from the group consisting of polyetherketoneketone(PEKK), polyetheretherketone (PEEK), polyetherketone (PEK), polyetherketoneetherketoneketone (PEKEKK), and Mixtures thereof. The at least one polymer may optionally include more than one polyaryletherketone. In embodiments, the "at least one polymer" may comprise, consist essentially of, or consist of at least one polyamide. The at least one pseudo-amorphous polymer may consist essentially of a specific polymer when the specific polymer is, for instance, at least 95%, at least 98%, at least 99%, or at least 99.9% by weight of the a least one pseudo-amorphous polymer.

In an exemplary embodiment, the poly(aryl ketone) comprises, consists essentially of, or consists of polyetherketoneketone (PEKK). Polyetherketoneketones suitable for use in the present invention may comprise or consist essentially of repeating units represented by the following formulas I and II:

where A is a p,p'-Ph-O-Ph- group, Ph is a phenylene radical, B is p-phenylene, and D is m-phenylene. The Formula I:Formula II (T:I) isomer ratio in the polyetherketoneketone can range from 100:0 to 0:100. The isomer ratio may be easily varied as may be desired to achieve a certain set of properties, e.g., by varying the relative amounts of the different monomers used to prepare the polyetherketoneketone. Generally speaking, a polyetherketoneketone having a relatively high Formula I:Formula II ratio will be more crystalline than a polyetherketoneketone having a lower Formula I:Formula II ratio. Thus, the T:I ratio may be adjusted so as to provide an amorphous (non-crystalline) polyetherketoneketone or a more crystalline polyetherketoneketone, as desired. In one embodiment, a polyetherketoneketone having a T:I isomer ratio of from about 50:50 to about 90:10 may be employed.

For example, the chemical structure for a polyetherketoneketone with all para-phenylene linkages [PEKK(T)] may be represented by the following formula III:

The chemical structure for a polyetherketoneketone with one meta-phenylene linkage in the backbone [PEKK(I)] may be represented by the following formula IV:

The chemical structure for a polyetherketoneketone with perfectly alternating T and I isomers, e.g., a homopolymer having 50% chemical compositions of both T and I [PEKK (T/I)] may be represented by the following formula V:

V

The poly(aryl ketones) may be prepared by any suitable method, which is well op known in the art. For example, a poly(aryl ketone) may be formed by heating a substantially equimolar mixture of at least one bisphenol and at least one dihalobenzoid compound or at least one halophenol compound. The polymer may be amorphous; pseudo-amorphous, or crystallized, which can be controlled through synthesis of the polymer. The polymer(s) implemented in embodiments disclosed herein are preferably amorphous or pseudo-amorphous. Additionally, the polymer(s) may also be of any suitable molecular weight and may be functionalized or sulfonated, if desired. In one embodiment, the polymer(s) undergo sulfonation or any example of surface modification known to one skilled in the art.

Suitable polyetherketoneketones are available from several commercial sources under various brand names. For example, polyetherketoneketones are sold under the brand name KEPSTAN® polymers by Arkema Inc., such as for example KEPSTAN 7000 and 7002. A variety of polyetherketoneketone polymers are manufactured and supplied by Arkema.

In some embodiments, pseudo-amorphous PEKK polymer having a T:I ratio of about 72:28, or 71:29, or 70:30, or 69:31, or 68:32, or 67:33, or more preferably 70:30, or 69:31, or 68:32 is used to provide extrusions (e.g. sheets which may be a production of extrusion cut to size) having a desirable thickness or thinness. In other embodiments, the PEKK polymer may have a viscosity at 360° C. of at least 400 Pa·s at 100 s-1 as measured by parallel plate rheometer. Use of such PEKK polymer enables extrusions having a thickness of less than 10 mm, or between about 5 to 0.1 mm, or no greater than 5 mm. Alternatively, use of such PEKK polymers enables extrusions having a thickness of at least 0.5 mm or between about 0.5 to about 10 mm, or at least greater than about 1 mm.

The amorphous or pseudo-amorphous polymers used in embodiments disclosed herein may include other polymers, in addition to the poly(aryl ketone). In one embodiment, the other polymers share similar melting points, melt stabilities, etc. and are compatible by exhibiting complete or partial miscibility with one another. In particular, other polymers exhibiting mechanical compatibility with the poly(aryl ketone) may be added to the composition. It is also envisioned, however, that the polymers need not be compatible with the poly(aryl ketone). The other polymers may include, for example, polyamides (such as polyamide 11 and polyamide 12 commercially available from Arkema under the name Rilsan, poly(hexamethylene adipamide) or poly(ε-caproamide)); fluorinated polymers (such as PVDF, PTFE and FEP); polyamides (such as polyetherimide (PEI), thermoplastic polyimide (TPI), and polybenzimidazole (PBI)); polysulfones/sulfides (such as polyphenylene sulfide (PPS), polyphenylene sulfone (PPSO$_2$), polyethersulfone (PES), and polyphenylsulfone (PPSU)); poly(aryl ethers); and polyacrylonitrile (PAN). In one embodiment, the other polymers include polyamide polymers and copolymers, polyimide polymers and copolymers, etc. Polyamide polymers may be particularly suitable in high temperature applications. The additional polymers may be blended with the poly(aryl ketone) by conventional methods.

The amorphous or pseudo-amorphous polymers used in embodiments disclosed herein may also include additional component(s), such as filler(s) or additive(s), to achieve specific properties desirable in particular applications, such as core-shell impact modifiers; fillers or reinforcing agents, such as glass fibers; carbon fibers; plasticizers; pigments or dyes; thermal stabilizers; ultraviolet light stabilizers or absorbers; antioxidants; processing aids or lubricants; flame retardant synergists, such as Sb$_2$O$_3$, zinc borate, and the like; or mixtures thereof. These components may optionally be present, for example, in an amount of about 0.1 weight percent to about 70 weight percent based on the total weight of the composition from which a polymer sheet or article (used to form a semi-crystalline article of disclosed embodiments) is formed (e.g., based on the total weight of a "dope" solution used to form a film, etc.).

Suitable fillers may include fibers, powders, flakes, etc., For examples, fillers may include at least one of carbon nanotubes, carbon fibers, glass fibers, polyamide fibers, hydroxyapatite, aluminum oxides, titanium oxides, aluminum nitride, silica, alumina, barium sulfates, grapheme, graphite, etc. The size and shape of the fillers are also not particularly limited. Such fillers may be optionally present in an amount from about 0.1 weight percent to about 70 weight percent, or from about 10 weight percent to about 70 weight percent (based on a total weight of the composition from which a polymer sheet or article used in disclosed embodiments is formed).

Methods of manufacturing a semi-crystalline article from at least one pseudo-amorphous polymer are based, in part, on improvements to traditional thermoforming methods. Traditional thermoforming methods in which a pseudo-amorphous or amorphous starting material is used yield pseudo-amorphous or amorphous molded articles. The crystallinity of these pseudo-amorphous or amorphous molded articles cannot be enhanced by heating the molded articles (e.g., in an oven) subsequent to the traditional thermoforming process without deformation.

Figure 1A:
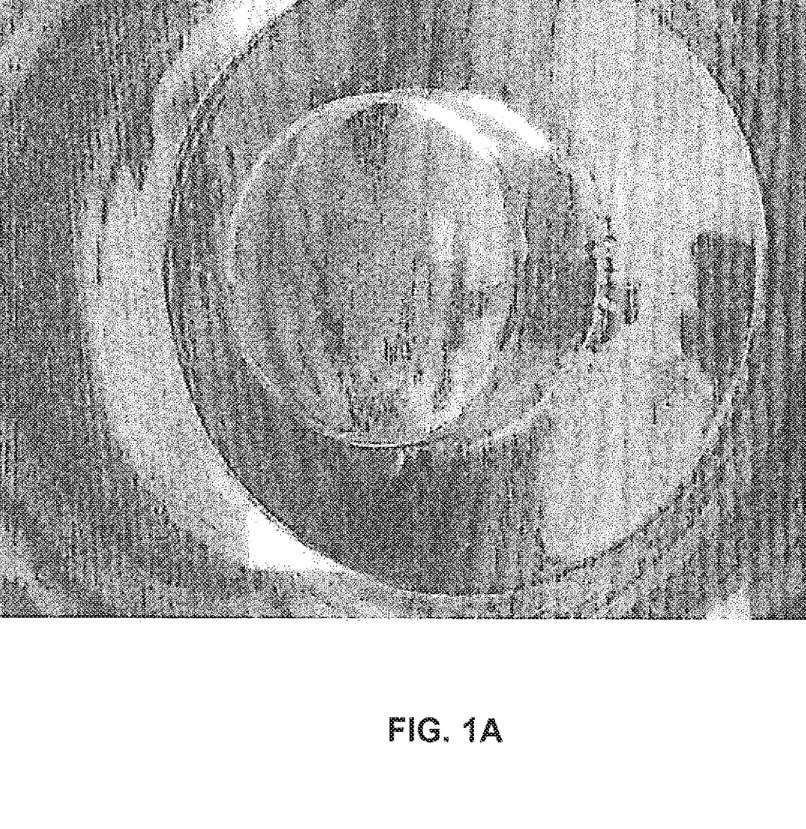
FIG. 1A depicts a thermoformed cup comprising PEKK produced according to traditional thermoforming processes and showing a transparency that is indicative of an to amorphous part.

FIG. 1A depicts a cup produced by subjecting a pseudo-amorphous PEKK to traditional thermoforming methods. The pseudo-amorphous PEKK film was heated to a temperature above the glass transition temperature of the PEKK and then placed onto a 25° C. mold. As can be seen from the figure, the resulting molded cup exhibits transparency which is indicative of an amorphous part.

Figure 1B:
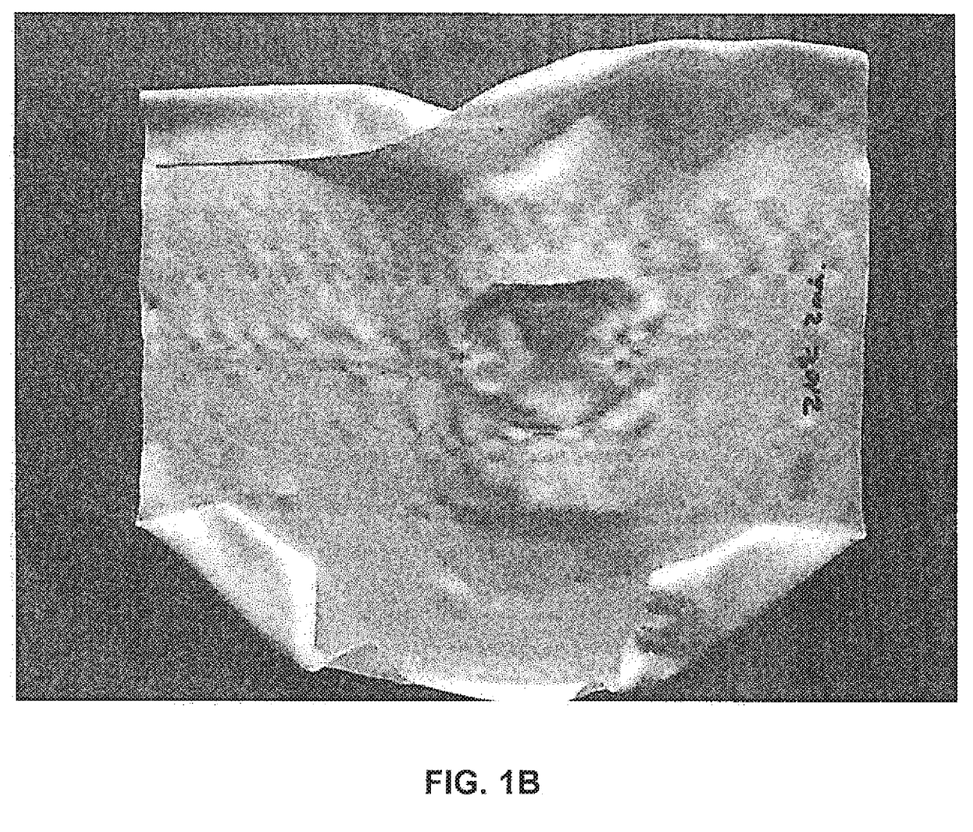
FIG. 1B depicts the thermoformed cup after being placed in an oven and heated to a temperature above the glass transition temperature of the polymer to crystallize the part.

Subsequent to production of the pseudo-amorphous part depicted in FIG. 1A, the part was placed in an oven and heated above the glass transition temperature of the PEKK to crystallize the part. The result of the crystallization step is depicted in FIG. 1B. As can be seen from the figure, the material previously molded into a cup form is opaque, indicative of a crystalline article; however, the cup of FIG. 1A did not maintain its thermoformed structure.

Figure 2:
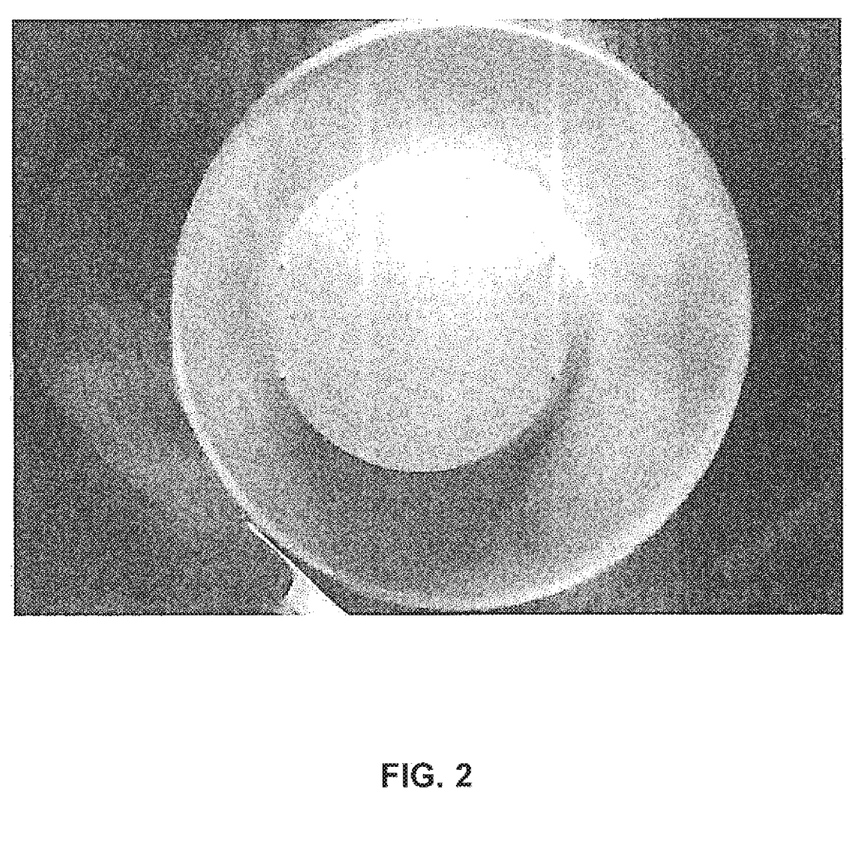
FIG. 2 illustrates a thermoformed cup manufactured from a pseudo-amorphous sheet of PEKK according to an embodiment of a novel method disclosed herein and showing an opacity that is indicative of a semi-crystalline part.

Embodiments disclosed herein comprise methods of manufacturing a semi-crystalline article from a pseudo-amorphous or amorphous polymer sheet without distorting the formed article. Other embodiments disclosed herein comprise methods of manufacturing a semi-crystalline article from a previously formed pseudo-amorphous or amorphous polymer article without distorting the formed article. Depicted in FIG. 2 is a semi-crystalline article manufactured from a pseudo-amorphous PEKK subjected to an embodiment of a method disclosed herein. As can be observed, the molded cup of FIG. 2 demonstrates opacity indicative of a semi-crystalline article.

Methods of manufacturing a semi-crystalline article disclosed herein may comprise at least a crystallization step wherein at least one pseudo-amorphous polymer is heated to a temperature above the glass transition temperature of the pseudo-amorphous polymer and below the melting temperature of the pseudo-amorphous polymer for a time sufficient to allow the pseudo-amorphous polymer to crystallize while the pseudo-amorphous polymer is on a mold. In some embodiments, the pseudo-amorphous polymer that is heated the mold is a cold, pre-formed article having a shape similar to that of the mold.

In some embodiments, the method comprises a softening step in which at least one pseudo-amorphous polymer is heated to a temperature above the glass transition temperature of pseudo-amorphous polymer without substantive crystallizing the pseudo-amorphous polymer to soften the pseudo-amorphous polymer and a crystallization step wherein the at least one pseudo-amorphous polymer is heated to a temperature above the glass transition temperature of the pseudo-amorphous polymer and below the melting temperature of the pseudo-amorphous polymer for a time sufficient to allow the pseudo-amorphous polymer to crystallize. In some embodiments the pseudo-amorphous polymer may be placed on a mold during the softening step. In some embodiments the pseudo-amorphous polymer may be placed on a mold during the crystallization step before at least some of the crystallization takes place. A semi-crystalline molded article may be formed on the mold.

In some embodiments, the pseudo-amorphous polymer may be a poly(aryl ketone) which may be selected from the group of polyetherketoneketone (PEKK), polyetheretherketone (PEEK), polyetherketone (PEK), polyetherketoneetherketoneketone (PEKEKK), and mixtures thereof, preferably PEKK. According to some embodiments, the pseudo-amorphous polymer may be PEKK and may have a T:I isomer ratio within a range of 50/50 to 80/20. In some embodiments, the pseudo-amorphous polymer may have a T:I isomer ratio of 70/30 (+/−2). In some embodiments, the pseudo-amorphous polymer does not include a nucleating agent.

In some embodiments, the softening step may be-performed in an oven (e.g., similar to an indexing step performed traditional thermoforming methods). In some embodiments, subsequent to the softening step, the pseudo-amorphous polymer may be vacuum pulled onto a heated mold and maintained on the mold for a period of time. In some embodiments, subsequent to placing the pseudo-amorphous polymer onto the heated mold, the pseudo-amorphous polymer may be subjected to a cooling process (e.g., using a fan). In some embodiments, the polymer may be held on the mold by the vacuum for a period of thirty to sixty seconds. In some embodiments, the cooling process may begin, e.g., thirty seconds after the beginning of the crystallization step. In other embodiments, the cooling process may begin, e.g., forty seconds after the beginning of the crystallization step. In some embodiments, the time period from which the starting material is subjected to the softening, crystallization, and cooling steps (i.e., the "total cycle-time") is less than one minute. In some embodiments, the total cycle time is around 90 seconds. In some embodiments, the total cycle time is less than 90 seconds.

In some embodiments, the pseudo-amorphous polymer may be in the form of a sheet. In such embodiments, the sheet may be maintained on the mold during the crystallization step for a time period within the range of about one second to about one minute. For instance, the sheet may be maintained on the mold during the crystallization step for a time period of: five minutes or less, one minute or less, forty seconds or less, thirty seconds or less, twenty seconds or less or ten seconds or less. In some embodiments, the pseudo-amorphous polymer, whether in sheet or molded form, may be transparent or semi-transparent.

The temperature to which the pseudo-amorphous polymer is heated in the softening step will be dependent upon the pseudo-amorphous polymer used. In some embodiments, the pseudo-amorphous polymer may be heated to a temperature within the range of 380° F. to 415° F. during the softening step.

In some embodiments, the mold may be heated on at least one side. In some embodiments the mold is heated on two sides. The mold may be, for example, a female mold, a male meld, a two-piece mold, etc.

In some embodiments, during crystallization, additional or secondary heating may be applied to the side of a PEKK sheet that is not in contact with the hot mold, especially for thicker sheets.

The mold may be heated, e.g, by implementing electric cartridge heaters. The mold and/or polymer on the mold may be heated, in other manners, e.g., infrared heating, etc. A temperature of the mold may be measured by using, e.g., a thermocouple. The mold may be heated to and maintained at a temperature or within a temperature range during the crystallization step. The temperature, or temperature range within which the mold is maintained will be dependents upon the pseudo-amorphous polymer used. In some embodiments, the mold may be heated to a temperature in the range of 440° to 450° F. during the crystallization step.

In some embodiments, the pseudo-amorphous polymer is placed on the mold during or immediately prior to the crystallization step. In some embodiments, the pseudo-amorphous polymer may be placed onto the mold using a vacuum subsequent to the softening step. In other embodiments, the pseudo-amorphous polymer is maintained on the mold during both the softening step and the crystallization step.

In some embodiments, the molded article produced may demonstrate at least 1% (absolute) increased crystallinity over the pseudo-amorphous polymer, at least 5% increased crystallinity over the pseudo-amorphous polymer, and optionally increased crystallinity over the pseudo-amorphous polymer within the range of 30-40%. In some embodiments, the crystallinity of the semi-crystalline molded article may be at least 10%, at least 15%, preferably at least 20%, more preferably at least 30% or greater. Absolute as used herein means that, for example, a 1% increase of a starting material at 5% crystallinity results in at least 6%, or optionally more, crystallinity.

Crystallinity of the molded article may be inferred based upon, e.g., the appearance of the molded article. In some embodiments, a semi-crystalline molded article will have an opaque appearance. Crystallinity of the molded article May be measured, e.g., by X-ray diffraction (XRD). Crystallinity of the molded article may also be measured, e.g., by differential scanning calorimetry (DSC). For instance, X-ray diffraction data may be collected with copper K-alpha radiation at 0.5 deg/min for two-theta angles ranging from 5.0° to 60.0°. The step size used for data collection should be 0.05° or lower. The diffraetometer optics should be set as to reduce air scattering in the low angle region around 5.0° two-theta. Crystallinity data may be calculated by peak fitting X-ray patterns and taking into account crystallographic data for the polymer of interest. A linear baseline may be applied to the data between 5° and 60°.

Similarly, crystallinity of the pseudo-amorphous polymer may be inferred based upon, e.g., the appearance of the pseudo-amorphous polymer. In some embodiments, a pseudo-amorphous polymer will have a translucent or almost translucent appearance. Crystallinity of the pseudo-amorphous polymer may be measured, e.g., by X-ray diffraction (XRD) as described above, differential scanning calorimetry (DSC), etc.

Other embodiments of the present invention are directed to semi-crystalline molded articles prepared from sheets of at least one pseudo-amorphous polymer by a process of heating a sheet of at least one pseudo-amorphous polymer to a temperature above the glass transition temperature of the pseudo-amorphous polymer without substantive crystallizing the pseudo-amorphous polymer to soften the pseudo-amorphous polymer and heating the sheet to a temperature above the glass transition temperature of the pseudo-amorphous polymer and below the melting temperature of the pseudo-amorphous polymer for a time sufficient to allow the pseudo-amorphous polymer to crystallize, wherein the sheet is placed on a mold before at least some of the crystallization takes place and is transformed into a semi-crystalline molded article based upon the mold. Still other embodiments of the present invention are directed to semi-crystalline molded articles prepared from a transparent or semi-transparent pseudo-amorphous polymer by a process of placing the pseudo-amorphous article onto a mold, heating the mold to a temperature above the glass transition temperature of the pseudo-amorphous polymer and below the melting temperature of the pseudo-amorphous polymer for a time sufficient to allow the pseudo-amorphous polymer to crystallize and transforming the pseudo-amorphous article into the semi-crystalline molded article.

In embodiments directed to semi-crystalline molded articles, the at least one pseudo-amorphous polymer may comprise a poly(aryl ketone), such as a PAEK selected from the group consisting of polyetherketoneketone (PEKK), polyetheretherketone (PEEK), polyetherketone (PEK), polyetherketoneetherketoneketone (PEKEKK), and mixtures thereof. In some embodiments, the semi-crystalline molded article may comprise PEKK.

In one preferred embodiment, during the crystallization step, certain selective or predetermined areas of the part may remain amorphous. For example, during infrared heating of a mold, the infrared heating may be carried out by selectively cutting the infrared source using a mask, the mask being placed between the infrared source and the surface of the thermoformed sheet. The so-obtained amorphous areas may be used to carry out additional forming or welding steps. In addition, the amorphous area may be, for example, thermoformed in a second or additional step. Preferably, after this second or additional thermoforming step, a final object is fully or substantially fully crystallized.

The amorphous area also can be welded using conventional welding techniques such as laser welding, ultrasonic welding, and hot plates so as to either laser weld multiple components into an assembly or to add functionalities to the thermoformed part. In the former case, an example of application may consist in thermoforming a loud speaker cone and weld the cone to the support spider, thus eliminating the use of adhesives. Preferably, after welding, the final part is fully or substantially fully crystallized.

Aspects of the disclosure include:

1. A method of manufacturing a semi-crystalline article from at least one pseudo-amorphous polymer comprising: as a softening step, heating at least one pseudo-amorphous polymer to a temperature above the glass transition temperature of the pseudo-amorphous polymer the pseudo-amorphous polymer to soften the pseudo-amorphous polymer; as a crystallization step, heating the at least one pseudo-amorphous polymer to a temperature above the glass transition temperature of the pseudo-amorphous polymer and below the melting temperature of the pseudo-amorphous polymer for a time sufficient to allow the pseudo-amorphous polymer to crystallize; placing the pseudo-amorphous polymer on a mold during either the softening step or the crystallization step before the crystallization takes place; and forming an semi-crystalline molded article, wherein the pseudo-amorphous polymer is a poly aryl ether ketone (PAEK) selected from the group consisting of polyetherketoneketone (PEKK), polyetherketone (PEK), polyetherketoneetherketoneketone (PEKEKK), and mixtures thereof, preferably PEKK.

2. The method of aspect 1, wherein the pseudo-amorphous polymer is PEKK and has a T:I isomer ratio in the range of 50/50 to 85/15, preferably in the range of 65/35 to 75/25, more preferably of about 70/30.

3. The method of aspects 1 or 2, wherein the pseudo-amorphous polymers in the form of a sheet.

4. The method of aspect 3, wherein the sheet has a thickness from greater than 300 microns up to 7000 microns.

5. The method of any of aspects 1-4, wherein the sheet is obtained on the mold during the crystallization step for a time period of one minute or less, optionally thirty seconds or less or twenty seconds or less.

6. The method of any of aspects 1-5, wherein the mold is heated on one side.

7. The method of any of aspects 1-6, wherein the mold is heated to a temperature in the range of 380° F. to 550° F., optionally 400° F. to 500° F., 425° F. to 460° F., or 440° F. to 450° F.

8. The method of any of aspects 1-7, Wherein during the softening step, the pseudo-amorphous polymer is heated to a temperature within the range of 380° F. to 450° F., optionally 400° F. to 440° F. or 420° F. to 440° F.

9. The method of any of aspects 1-8, wherein the molded article has an increased crystallinity over the pseudo-amorphous polymer of at east five percent, at least ten percent, at least fifteen percent, at least twenty percent, at least thirty percent, preferably within the range of thirty to forty percent.

10. The method of any of aspects 1-9, wherein the sheet placed onto the mold by a vacuum subsequent to the softening step.

11. A semi-crystalline molded article prepared from a sheet of at least one pseudo-amorphous polymer, wherein the semi-crystalline molded article is formed by a process of: heating a sheet of at least one pseudo-amorphous polymer to a temperature above the glass transition temperature of the pseudo-amorphous polymer to soften the pseudo-amorphous polymer; heating the sheet to a temperature above the glass transition temperature of the pseudo-amorphous polymer and below the melting temperature of the pseudo-amorphous polymer for a time sufficient to allow the pseudo-amorphous polymer to crystallize; placing the sheet on a mold before the crystallization takes place; and transforming the sheet into the semi-crystalline molded article, wherein the pseudo-amorphous polymer is a poly aryl ether ketone (PAEK) selected from the group consisting of polyetherketoneketone (PEKK), polyetherketone (PEK), polyetherketoneetherketoneketone (PEKEKK), and mixtures thereof, preferably PEKK.

12. A method of manufacturing an article according to aspect 1, wherein certain or pre-selected areas of the article are remain amorphous (non-crystalline) to enable an additional thermal forming or welding step.

The following examples are provided to describe properties and embodiments of the invention in greater detail and are intended to illustrate, not limit, the invention.

EXAMPLES

Example 1

Thermoforming Conditions for PEKK Film

Films of pseudo-amorphous Kepstan™ 7002 PEKK having a thickness of 0.020 inches were heated in an oven to index temperatures in the range of 380° F. to 415° F. The film had a T:I ratio of 70/30, a $T_g$ of 344° F. and a $T_m$ of 630° F. The film did not exhibit any measurable crystallinity when analyzed by X-ray diffraction, confirming they are pseudo-amorphous. After indexed, the films were removed from the oven and a vacuum applied to pull the film onto a heated mold and hold it in place thereon. The films were held on the mold for time periods ranging from 40 seconds to 60 seconds. The mold temperature used was in the range of 425° F. to 450° F. Cooling of the crystallized article formed on the mold was accomplished by applying a fan to the article. For the various films, the fan was turned on thirty seconds or forty seconds after the indexed film was removed from the oven and placed on the mold. The results of the experiments run are provided in Table 1.

TABLE 1

| Part No. | Mold Temp (° F.) | Index Temp (° F.) | Vacuum Time (s) | Fan Delay (s) |
| --- | --- | --- | --- | --- |
| 1 | 440 | 390 | 40 | 30 |
| 2 | 440 | 380 | 40 | 30 |
| 3 | 440 | 390 | 40 | 30 |
| 4* | 425 | 380 | 40 | 30 |
| 5 | 440 | 390 | 50 | 30 |
| 6 | 450 | 400 | 50 | 40 |
| 7 | 450 | 415 | 60 | 40 |
| 8 | 450 | 400 | 60 | 40 |

In the above table, the fan delay represents the total time that the part was allowed to crystallize on the heated mold prior to cooling being initiated. The total cycle time for films Which formed the most ideal parts was 90 seconds. The total cycle time is a time period at which the cold sheet entered the oven to be indexed to the time that the part is considered "finished" (i.e., the part is formed and sufficiently cooled).

The films used in the experiment were transparent prior to indexing and subsequent to indexing, indicative of a pseudo-amorphous or amorphous film. When placed on the heated mold, the portion of the filth in contact with the mold became opaque in appearance, whereas portions of the film not in contact with the mold (i.e., that were more rapidly cooled) remained transparent or translucent in appearance. The observed opacity of the molded part is indicative of crystallinity. Thus, the pseudo-amorphous films were formed into crystalline parts.

Notably, Part No. 4, marked by an asterisk above, became stuck in the mold and thus was disfigured in comparison to part nos. 1-3 and 5-8. Part 4 demonstrated low crystallinity which can be attributed, at least in part, to the relatively cold temperature of the mold used to form Part 4 as compared with the mold temperature implemented to form parts 1-3 and 5-8.

Example 2

Crystallinity Measurements for The formed PEKK Filth

Films of pseudo-amorphous Kepstan™ 7002 PEKK having a thickness of 0.020 inches were heated in an oven to index temperatures in the range of 195° C. to 225° C. The film had a T:I ratio of 70/30, a $T_g$ of 344° F. and a $T_m$ of 630° F. The Elm did not exhibit any measurable crystallinity when analyzed by X-ray diffraction, confirming they are pseudo-amorphous. After indexed, the films were removed from the oven and a vacuum applied to pull the film onto a heated mold and hold it in place thereon. The films were held on the mold for a period of 80 seconds. The mold temperature used was in the range of 195° C. to 285° C. Cooling of the crystallized article formed on the mold was accomplished by applying a fan to the article. For the various films, the fan was turned on 50 seconds after the indexed film was removed from the oven and placed on the mold. The results of the experiments run are provided in Table 2.

TABLE 2

| Index Temp (° C.) | Mold Temp (° C) | Crystallinity of thermoformed part (%) |
| --- | --- | --- |
| 195 | 195 | 7 |
| 195 | 205 | 9 |
| 195 | 253 | 25 |
| 195 | 285 | 26 |
| 210 | 195 | 9 |
| 210 | 205 | 17 |
| 225 | 195 | 21 |
| 225 | 205 | 24 |
| 225 | 225 | 25 |
| 225 | 243 | 25 |
| 225 | 265 | 26 |
| 225 | 285 | 24 |

The films used in the experiment were transparent prior to indexing and subsequent to indexing, indicative of a pseudo-amorphous or amorphous film. When placed on the heated mold, the portion of the film in contact with the mold became opaque in appearance, whereas portions of the film not in contact with the mold (i.e., that were more rapidly cooled) remained transparent or translucent in appearance. The observed opacity of the molded part is indicative of crystallinity.

The semi-crystalline composition of the molded part was verified by X-ray diffraction measurements. X-ray diffraction data was collected with copper K-alpha radiation at deg/min for two-theta angles ranging from 5.0° to 60.0°. The step size used for data collection was 0.05° or lower. The diffractometer optics were set to reduce air scattering in the low angle region around 5.0 two-theta.

Crystallinity data was calculated by peak fitting the X-ray patterns and taking into account crystallographic data for PEKK forms I and II (as described by Gardner et al. in POLYMER, 1992, Vol. 33, No. 12, pp. 2483-2495). A linear baseline was applied to the data between 5.0° and 60.0°.

The experimental data in Table 2 illustrates semi-crystalline articles having a crystallinity of 7% to 26% as measured by XRD. Additionally, the application of the described method of Example 2 to pseudo-amorphous Kepstan™ 7002 enables a broad range of working conditions, as illustrated in Table 2.

Example 3

Thermoforming Conditions for PEKK Sheets

Sheets of pseudo-amorphous Kepstan™ 7002 PEKK having a thickness of 0.08 inches were heated in an oven to index temperatures in the range of 380° F. to 420° F. The film had a T:I ratio of 70/30, a $T_g$ of 344° F. and a $T_m$ of 630° F. After indexed, the sheets were removed from the oven and a vacuum applied to pull the film onto a heated mold and hold it in place thereon. The sheets were held on the mold for time periods ranging from 90 seconds to 150 seconds. The mold temperature used was in the range of 425° F. to 482° F. Cooling of the crystallized article formed on the mold was accomplished by applying a fan to the article. For the various sheets, the fan was turned on 70 seconds to 120 seconds after the indexed film was removed from the oven and placed on the mold. A summary of the conditions to thermoform sheets are provided in Table 3. All of the sheets

TABLE 3

| Part No. | Oven Preheat (° C) | Mold temp (° C) | Index temp (° F) | Vacuum time (s) | Fan Delay (s) |
|---|---|---|---|---|---|
| 9 | 455 | 450 | 400 | 90 | 70 |
| 10 | 455 | 450 | 400 | 90 | 70 |
| 11 | 478 | 450 | 420 | 120 | 90 |
| 12 | 464 | 464 | 410 | 120 | 90 |
| 13 | 473 | 464 | 410 | 150 | 120 |
| 14* | 437 | 464 | 400 | 150 | 120 |

*had heat applied to side of part not in contact with the mold from a 250 w heat lamp.

The sheets used in the experiment were transparent prior to indexing and subsequent to indexing, indicative of a pseudo-amorphous or amorphous sheet. When placed on the heated mold, the portion of the film in contact with the mold became opaque in appearance, whereas portions of the sheet not in contact with the mold (i.e., that were more rapidly cooled) remained transparent or translucent in appearance. The observed opacity of the molded part is indicative of crystallinity. Parts 9 through 14 had an increasing degree of opacity in the section in contact with the heated mold. Thus, the pseudo-amorphous sheets were formed into crystalline parts. Thick sheets required longer time in contact with the hot mold and possibly additional heating applied to the side not in contact with a mold to produce a fully crystalline part.

What is claimed is:

1. A method of manufacturing a semi-crystalline article from at least one pseudo-amorphous polymer using a thermo-forming process, said method comprising:
   as a softening step, heating at least one pseudo-amorphous polymer having less than about seven % crystallinity and in sheet form to a temperature above the glass transition temperature of the pseudo-amorphous polymer to soften the pseudo-amorphous polymer;
   as a crystallization step, heating the at least one pseudo-amorphous polymer to a temperature above the glass transition temperature of the pseudo-amorphous polymer and below the melting temperature of the pseudo-amorphous polymer for a time sufficient to allow the crystallinity of pseudo-amorphous polymer to increase on a mold;
   placing the pseudo-amorphous polymer on the mold during either the softening step or the crystallization step before the increase in crystallization takes place; and
   forming an semi-crystalline molded article wherein said crystallinity increases by at least 5% (absolute) crystallinity over the pseudo-amorphous polymer,
   wherein the pseudo-amorphous polymer is a poly aryl ether ketone (PAEK) selected from the group consisting of polyetherketoneketone (PEKK), polyetherketone (PEK), polyetherketoneetherketoneketone (PEKEKK), and mixtures thereof.

2. A method of manufacturing an article according to claim 1, wherein the PAEK is PEKK.

3. A method of manufacturing an article according to claim 2, wherein the PEKK has a T:I isomer ratio within a range of 50/50 to 85/15.

4. A method of manufacturing an article according to claim 3, wherein the PEKK has a T:I isomer ratio of about 70/30.

5. A method of manufacturing an article according to claim 1, wherein the sheet has a thickness greater than about 300 microns.

6. A method of manufacturing an article according to claim 1, wherein the sheet is maintained on the mold during the crystallization step for a time period of one minute or less.

7. A method of manufacturing an article according to claim 1, wherein the sheet is maintained on the mold during the crystallization step for a time period of thirty seconds or less.

8. A method of manufacturing an article according to claim 1, wherein the sheet is maintained on the mold during the crystallization step for a time period of twenty seconds or less.

9. A method of manufacturing an article according to claim 1, wherein the mold is heated on at least one side.

10. A method of manufacturing an article according to claim 9, wherein the mold is heated to a temperature in the range of 380° F. to 550° F.

11. A method of manufacturing an article according to claim 10, wherein the pseudo-amorphous polymer is heated to a temperature within the range of 380° F. to 450° F. during the softening step.

12. A method of manufacturing an article according to claim 11, wherein the pseudo-amorphous polymer is placed on the mold immediately prior to the crystallization step.

13. A method of manufacturing an article according to claim 1, wherein the molded article has at least a ten percent increased crystallinity over the pseudo-amorphous polymer.

14. A method of manufacturing an article according to claim 1, wherein the molded article has an increased crystallinity over the pseudo-amorphous polymer within a range of thirty to forty percent.

15. A method of manufacturing an article according to claim 5, wherein the sheet is placed onto the mold by a vacuum subsequent to the softening step.

16. A method of manufacturing an article according to claim 2, wherein the PEKK has a T:I isomer ratio of 70:30, or 69:31, or 68:32.

17. A method of manufacturing an article according to claim 2, wherein the PEKK has a T:I isomer ratio of 71:29 or 72:28.

18. A method of manufacturing an article according to claim 2, wherein the PEKK has a T:I ratio of 70:30 (+/−2) and/or wherein the molded article has at least a ten percent increased crystallinity over the pseudo-amorphous polymer.

* * * * *